(12) United States Patent
Dake et al.

(10) Patent No.: US 11,039,634 B2
(45) Date of Patent: Jun. 22, 2021

(54) PROCESS FOR PREPARING A BROTH COMPOSITION

(71) Applicant: International Dehydrated Foods, Inc., Springfield, MO (US)

(72) Inventors: Roger Dake, Springfield, MO (US); Nancy Lewis, Aurora, MO (US)

(73) Assignee: INTERNATIONAL DEHYDRATED FOODS, INC., Springfield, MO (US)

(*) Notice: Subject to any disclaimer, the term of this patent is extended or adjusted under 35 U.S.C. 154(b) by 0 days.

(21) Appl. No.: 14/210,284

(22) Filed: Mar. 13, 2014

(65) Prior Publication Data

US 2014/0271991 A1    Sep. 18, 2014

Related U.S. Application Data

(60) Provisional application No. 61/780,932, filed on Mar. 13, 2013.

(51) Int. Cl.
*A23L 23/10* (2016.01)
*A23L 13/30* (2016.01)

(52) U.S. Cl.
CPC .............. *A23L 23/10* (2016.08); *A23L 13/30* (2016.08)

(58) Field of Classification Search
CPC ............ A23L 1/40; A23L 1/313; A23L 23/10
USPC .......................................................... 426/56
See application file for complete search history.

(56) References Cited

U.S. PATENT DOCUMENTS

| | | | |
|---|---|---|---|
| 3,796,811 A * | 3/1974 | Huth et al. | A23L 1/231 |
| | | | 426/471 |
| 4,113,884 A | 9/1978 | Krasovec et al. | |
| 4,743,382 A * | 5/1988 | Williamson | B01D 21/0012 |
| | | | 210/786 |
| 5,073,394 A | 12/1991 | Dake et al. | |
| 2008/0187626 A1* | 8/2008 | Sorensen | 426/52 |

FOREIGN PATENT DOCUMENTS

| | | | |
|---|---|---|---|
| JP | 2012139186 A | 7/2012 | |
| KR | 20100009431 A | 1/2010 | |
| KR | 101189893 B1 | 10/2012 | |
| WO | 2008007667 A1 | 1/2008 | |

OTHER PUBLICATIONS

"Papain Clarase" ww.cbsbrew.com accessed Aug. 24, 2015.*
PCT/US2014/026790 International Search Report and Written Opinion dated Jun. 19, 2014, 10 pages.
Extended European Search Report dated Oct. 21, 2016, corresponding to European Patent Application No. 14774025.2.
Communication pursuant to Article 94(3) EPC dated Mar. 8, 2018, corresponding to European Patent Application No. 14774025.2.
European Patent Application No. 14774025.2, Communication pursuant to Article 94(3) EPC dated Oct. 15, 2018, 6 pages.
European Patent Application No. 14774025.2, Summons to attend oral proceedings pursuant to Rule 115(1) EPC dated Jul. 3, 2019, 9 pages.

* cited by examiner

*Primary Examiner* — Subbalakshmi Prakash
(74) *Attorney, Agent, or Firm* — Lathrop GPM LLP

(57) ABSTRACT

Disclosed here is a process for preparing a concentrated liquid composition (such as a broth) by heating and by treatment with one or more enzymes. The resultant composition may have high content of solids but are pumpable or pourable and have relatively long shelf life at room temperature.

17 Claims, No Drawings

PROCESS FOR PREPARING A BROTH COMPOSITION

RELATED APPLICATION

This application claims priority to U.S. Patent application 61/780,932 filed Mar. 13, 2013, the entire content of which is hereby incorporated by reference into this application.

BACKGROUND

1. Field of the Invention

This disclosure relates to a process for making a concentrated broth composition.

2. Description of Related Art

Broth and soups prepared from animals have high nutrition values. They are rich in proteins and have been shown to possess both nutritional and therapeutic values.

Many existing methods for making concentrated broth fail to efficiently utilized the broth derived from the meat processing industry. For instance, some methods fail to treat the broth efficiently with enzyme(s). Without the enzymatic treatment, the broth forms a jelly-like colloid and is difficult to process. The jelly-like nature of the broth interferes with water evaporation. Thus, it is very difficult to achieve higher solid concentration through evaporation without treating the broth with enzyme(s). Poor utilization of the broth not only causes economical waste but also generates excessive waste water and environmental pollutions.

SUMMARY

The instrumentalities disclosed here advance the art and overcome the problems outlined above by providing a pumpable broth composition having high percentage of solids and relatively long shelf life. In one aspect, the higher solids of the disclosed concentrated broth composition may help control microbial growth and prevent spoilage of the broth products. In another aspect, enzymatic treatment of the broth may reduce viscosity of the final concentrated broth composition which makes it easier to pour or pump the composition.

In one embodiment, a process is disclosed for making an improved broth composition. The process may include at least the following steps: (a) heating a starting broth to a temperature of between 50° C. and 70° C.; (b) adding to the starting broth one or more enzymes to form a mixture comprising the broth and the one or more enzymes; (c) incubating the mixture from step (b) with or without stirring while maintaining the mixture at a temperature of between 50° C. and 70° C.; and (d) concentrating the broth to obtain the composition. In another embodiment, the enzyme(s) may be added to the starting broth without the heating step (a). The mixture may then be incubated at a temperature under which the enzyme(s) may have the highest enzymatic activity, which may range from 0° C. to 100° C. The mixture that has been digested by the enzyme(s) may then be subject to the concentration step as described above in step (d).

In another embodiment, a process for making a shelf stable composition may include at least the following steps: (a) heating a starting broth to a temperature of between 50° C. and 70° C.; (b) adding to the starting broth one or more enzymes to form a mixture comprising the broth and the one or more enzymes; (c) incubating the mixture from step (b) with or without stirring while maintaining the mixture at a temperature of between 50° C. and 70° C.; and (d) inactivating the at least one enzyme to obtain the shelf stable composition. The inactivation step may help extend the shelf life of the final product. Step (b) can be performed before, after or at the same time as step (a), and step (d) may be followed by a concentration step to prepare a concentrated broth composition that contains high solids and is stable at room temperature for at least 12 months, 24 months, 36 months, 48 months, 60 months, or longer. The temperature of the starting broth in step (a) or during the incubation step above may be between 50° C. and 70° C., between 55° C. and 70° C., or between 60° C. and 70° C.

The starting broth may be derived from chicken, beef, pork or other animal or poultry sources. In one particular embodiment, the broth is a chicken broth. In one aspect, the starting broth may contain from 1% to 70% solids. In another aspect, the starting broth may contain from 3% to 4% solids. In another aspect, the starting broth may contain from 20% to 40% solids. The starting broth may be prepared on-site and may be used for making the present composition right after it is made fresh on-site. Alternatively, the starting broth may be from packaged products that are pre-made on-site or off-site.

In one embodiment, an enzymatic treatment step is employed by treating the broth with one or more enzymes. One or more enzymes may be used in this treatment step. Examples of the enzymes may include but are not limited to anti-gelling enzymes such as papain, or other proteinases or proteases isolated from edible fruits (e.g., papaya or pineapple) or fungi (e.g., mushroom), or other microorganisms. Examples of microorganisms may include but are not limited to molds (e.g., *Aspergillus*), yeast (e.g., *Saccharomyces*), bacteria (e.g., *Bacillus*), among others. In one aspect, at least one enzyme added in step (b) is an enzyme that detectably alters the flavor of the broth. Examples of such flavor-changing enzymes may include but are not limited to enzymes that digest proteins and produce certain peptides or amino acids that cause such a change in flavor. The enzyme or enzymes may be added in the form of a powder or as an aqueous solution or suspension. This enzymatic treatment step may help reduce the jelly-like nature of the broth. Preferably, insolubles are removed from the starting broth before the one or more enzymes are added.

In another embodiment, certain agents that help reduce the jelly-like nature of the broth may be used in place of the one or more enzymes in step (b). In one aspect, in lieu of purified enzyme(s), extracts of plants (including plant parts) that contain the desired proteinases or proteases may be used. Examples of plants (or plant parts) may include but are not limited to papaya or pineapple. Depending upon specific needs, certain chemicals in the extracts that confer upon the broth composition an undesirable flavor may be removed from the extracts prior to addition of the extracts into the broth.

In another embodiment, the temperature in step (a), step (b), step (c), or in all three steps (a)-(c) may be maintained at between 60° C. and 70° C. For instance, the temperature under which the starting broth is incubated with enzyme may be set at 62° C., 65° C. or 70° C. Elevated temperature may help reduce the gelatinous nature of the broth.

In another embodiment, the total amount of the one or more enzymes added in step (b) is less than 0.4% by weight of the solids in the broth. By way of example, the total amount of the one or more enzymes added in step (b) may be 0.3%, 0.2%, 0.1%, or lower by weight of the solids in the broth.

The incubation time in step (b) may vary depending on the temperature and the enzyme used. In one aspect, the mixture of step (b) may be incubated with stirring in step (c) for more than 60 minutes. In another aspect, the incubation time is less than 180 minutes. By way of example but not limitation, the incubation time may be 65 minutes, 70 minutes, 90 minutes, 180 minutes, 240 minutes, overnight, or even longer if needed. The combination of lower enzyme concentration and longer incubation time may help reduce the overall cost of the process. Conversely, higher enzyme concentration may be used in order to shorten the process time.

In another embodiment, the concentrating step in step (d) is performed by evaporation. After the enzymatic treatment, the broth is allowed to evaporate in order to obtain a more concentrated broth product. The concentrated composition obtained in step (d) may contain at least 50%, 60%, 70%, 80%, or 85% solids. A high percentage of the solids in the concentrated broth composition are proteins. In one aspect, this concentration step is similar to the steps a chef or a home cook would take to produce a stock reduction.

According to the present disclosure, the process may also include a step of heating the mixture after step (c) in order to inactivate the enzyme(s). The heating step may be performed for at least 5 minutes (for example, 5-10 minutes, or 5-20 minutes) at a temperature of at least 70° C., 72° C., or 75° C. In another aspect, the heating step may be performed for at least 2 minutes (for example, 2-5 minutes, or 2-20 minutes) at a temperature of at least 80° C., 85° C., or at least 90° C. Alternatively, the heating step may be performed for at least 3 seconds (for example, 3-5 seconds, or 3-20 second) at an elevated temperature of at least 100° C., or at least 110° C. or higher.

In another embodiment, the disclosed composition obtained from step (d) has relatively low water activity. By way of example, the water activity of the final product may be less than 0.85, or even less than 0.8 or 0.6. In one aspect, salt may added to the composition to further reduce the water activity. The salt may be added to the composition prior to step (d), during step (d), or after performance of step (d). Examples of salt may include but are not limited to NaCl, or other edible salts. For example, about 5 percent of salt may be added to a product that is 40% solids to achieve about 0.83 water activity.

Reduced water activity in the final broth product may help reduce microbial growth during storage and transportation. As a result, no anti-microbial agents or preservatives need to be added into the broth during or at the end of the process. Because anti-microbial agents and preservatives may be perceived negatively by consumers, avoidance of these substances may add to the marketability of the broth products. In one embodiment, nitrogen or other inert gases may be used during packaging to modify the head space in order to prevent growth of mold or bacteria.

The reduction of water activity may also simplify the packaging process of the final product. More specifically, because the broth composition obtained from step (d) contains little water to support microbial growth, sterile conditions may not be required when packaging the composition of the instant disclosure. In another aspect, the shelf life of the final broth composition obtained in step (d) may be at least 6 months, at least 12 months, at least 24 months, or at least 36 months at room temperature. By way of example, the shelf life of the final broth composition may be 12-24 months, 12-36 months, 24-36 months, or 36-48 months at room temperature.

In one embodiment, no anti-foaming agent is added in the process as disclosed herein. Because anti-foaming agent may be perceived as unsafe additives by consumers, avoidance of anti-foaming agents in the instant process may be highly desirable.

In another embodiment, the composition prepared according to the instant disclosure is pumpable or pourable, which is advantageous for packaging and handling. For instance, the broth may contain at least 50%, 60%, 70%, 80%, or 85% solids but is still pourable (or pumpable) at room temperature.

DETAILED DESCRIPTION

The present disclosure relates to improved broth compositions and methods of preparing the same. In one aspect, the disclosed broth composition has higher solids than many other broth products prepared according to existing methods. In another aspect, the disclosed broth product is pumpable which makes it easier for packaging and handling. Another advantage afforded by the instant methods is the relatively longer shelf life of the resulting broth product.

The term "broth" refers to an aqueous composition containing at least one solute. A broth may be a liquid, a solution, or a suspension. For purpose of this disclosure, the term "broth" may be used interchangeably with the terms "stock," "extract," "fond," or "demi-glace." It is to be recognized that as a broth becomes more and more concentrated, it may become highly viscous and may have much lower liquidity as compared to a dilute broth. The concentrated broth composition of the present disclosure may be a highly concentrated broth in a liquid form. Alternatively, a concentrated broth composition may be a dried or semi-dried broth product in the form of powder or paste.

The starting broth of the instant disclosure is usually a more dilute broth obtained from meat processing as a side product or prepared as a raw material. The final broth composition prepared according to the present disclosure may be a much more concentrated broth or may be in the form of powder or paste.

In one embodiment of the present disclosure, the step (a) of heating the starting broth and the step of adding to the starting broth one or more enzymes to form a mixture comprising the broth and the one or more enzymes both precede step (c) of incubating the mixture. In another embodiment, step (a) can be performed before or after step (b).

The percentage of solid in the compositions of the instant disclosure is calculated by weight. For example, when 100 grams of broth contains 20 grams of solid material, the percent solid of the broth is 20%.

The term "detectably" means a characteristics that may be detected by a person having average sensitivity or by an instrument having average sensitivity at the time of the invention.

For purpose of this application, the terms "pumpable" and "pourable" may be used interchangeably to refer to the fluidic characteristics of a composition which can be transferred by using a device (e.g., a pump) typically used in the food (e.g., broth) packaging industry or which can be poured from one container into another.

The term "water activity" refers to unbound water in a material, for example, food. Water that is not bound to food molecules can support the growth of bacteria yeast or molds (fungi). Thus, water activity may be used to indicate the inherent tendency by which certain food material may become contaminated or spoiled.

The range of water activity may extend from 0 (bone dry) to 1.0 (pure water). Most food products have a water activity level in the range of 0.2 for very dry foods to 0.99 for moist fresh foods. In practice, water activity is usually measured as equilibrium relative humidity (ERH). The water activity of fresh meat is typically about 0.99, while the water activity of aged cheddar cheese is about 0.85. Dried food usually has lower water activity. For instance, most dried fruit products have water activity of about 0.6, while dry milk powder has water activity of about 0.2.

The terms "agent," "ingredient," "component," and "constituent" may be used interchangeably in this disclosure.

In another embodiment, before packing, the temperature of the enzyme-treated broth may be raised to a temperature that is sufficient to denature the enzyme(s).

The compositions of the present disclosure may contain additional ingredients. It is to be understood that these additional ingredients may confer upon the disclosed compositions certain desirable properties. Examples of such desirable properties may include but are not limited to enhanced inhibition of spoilage microorganisms, improved flavor, or increased stability of the composition, and so on.

It is to be noted that, as used in this disclosure, the singular forms "a," "an," and "the" include plural referents unless the context clearly dictates otherwise. Thus, for example, reference to "a composition" includes reference to two or more of such compositions.

The disclosed compositions may be prepared and/or distributed in a concentrated form or a diluted form. A concentrate may be dissolved or dispersed in a solvent to form a reconstituted solution.

Changes may be made in the disclosed compositions and methods without departing from the scope hereof. It should thus be noted that the matter contained in the above description should be interpreted as illustrative and not in a limiting sense. The following claims are intended to cover all generic and specific features described herein, as well as all statements of the scope of the present methods and compositions, which, as a matter of language, might be said to fall therebetween.

The contents of all cited references (including literature references, patents, patent applications, and websites) that maybe cited throughout this application are hereby expressly incorporated by reference in their entirety for any purpose, as are the references cited therein.

We claim:

1. A process for making a broth composition, said process comprising:
    (a) heating a starting broth to a temperature of between 50° C. and 70° C.;
    (b) removing insoluble particulate from the starting broth of step (a) to obtain a broth substantially free of insoluble particulate;
    (c) adding to the broth substantially free of insoluble particulate obtained in step (b) at least one enzyme to form a mixture comprising the broth obtained in step (b) and the at least one enzyme;
    (d) incubating the mixture from step (c) with stirring for at least 60 minutes while maintaining said mixture at a temperature of between 50° C. and 70° C.; and
    (e) concentrating the mixture from step (d) after the incubation to obtain a pumpable broth composition comprising at least 50% solids and having a water activity of less than 0.85, and
    wherein said step (a) is performed prior to said step (b), and wherein said step (b) is performed prior to said step (c), and wherein the broth is substantially free of insoluble particulate prior to addition of said at least one enzyme in step (c).

2. The process of claim 1, wherein the starting broth is derived from chicken.

3. The process of claim 1, wherein the starting broth is heated to a temperature of between 55° C. and 70° C. in step (a) and is incubated at a temperature of between 55° C. and 70° C. in step (d) after addition of said at least one enzyme in step (c).

4. The process of claim 3, wherein the temperature in both step (a) and step (d) is between 60° C. and 70° C.

5. The process of claim 1, wherein said at least one enzyme added in step (c) comprises an anti-gelling enzyme.

6. The process of claim 1, wherein said at least one enzyme added in step (c) comprises an enzyme that detectably alters the flavor of the broth.

7. The process of claim 1, wherein the total amount of said at least one enzyme added in step (c) is less than 0.4% by weight of total solids in the broth.

8. The process of claim 1, wherein no anti-foaming agent is added during the process.

9. The process of claim 1, wherein the mixture is incubated with stirring in step (d) for more than 60 minutes but less than 180 minutes.

10. The process of claim 1, wherein the composition obtained from step (e) comprises at least 80% solids.

11. The process of claim 1, wherein no anti-microbial agent is added into the composition obtained from step (e).

12. The process of claim 1, wherein the concentrating step in step (e) is performed by evaporation.

13. The process of claim 1, further comprising a step of adding an edible salt to the composition of step (e).

14. The process of claim 1, wherein the composition is stable at room temperature for at least 36 months.

15. The process of claim 1, further comprising a step of heating the mixture after step (d) for at least 5 minutes at a temperature of at least 72° C.

16. The process of claim 1, further comprising a step of heating the mixture after step (d) for at least 3 seconds at a temperature of at least 100° C.

17. The process of claim 1, wherein said at least one enzyme added in step (c) is in the form of a plant extract, said plant extract comprising said at least one enzyme.

* * * * *